United States Patent [19]

Umeda et al.

[11] 4,288,091
[45] Sep. 8, 1981

[54] APPARATUS FOR COUPLING A TRACTOR, A DUMP TRAILER AND A DUMP TRUCK

[75] Inventors: Haruhiko Umeda, Yokohama; Hidehiro Takeuchi, Kawasaki; Masaru Uenoyama, Ayase; Kotoshige Ishizuki, Yokohama; Hiroyuki Ando, Kawasaki; Hideo Hara, Tokyo, all of Japan

[73] Assignee: Kabushiki Kaisha Komatsu Seisakusho, Tokyo, Japan

[21] Appl. No.: 951,271

[22] Filed: Oct. 13, 1978

[30] Foreign Application Priority Data

Oct. 13, 1977 [JP] Japan .......................... 52-136263[U]

[51] Int. Cl.³ .............................................. B60D 1/04
[52] U.S. Cl. ............................ 280/415 A; 280/479 R; 280/515
[58] Field of Search ............... 280/415 R, 415 A, 435, 280/504, 508, 511, 515, 479 R, 479 A, 512, 513, 417

[56] References Cited

U.S. PATENT DOCUMENTS

| 2,475,878 | 7/1949 | Clark | 280/512 |
| 2,482,868 | 9/1949 | Pollard | 280/435 |
| 3,542,399 | 11/1970 | Myers | 280/415 A |
| 3,801,134 | 4/1974 | Dees | 280/415 A |
| 4,015,855 | 4/1977 | Murray | 280/415 A |

Primary Examiner—John J. Love
Assistant Examiner—Randall A. Schrecengost
Attorney, Agent, or Firm—Armstrong, Nikaido, Marmelstein & Kubovcik

[57] ABSTRACT

An apparatus for coupling a tractor, a dump trailer and a dump truck wherein the dump trailer is adapted to be selectively towed by the tractor or by the dump truck. A draw bar having a trunnion and a hole at the leading end portion is pivotally mounted on the dump trailer. The trunnion is adapted to be engaged with a gripper mounted on an arm member of the tractor so as to enable the dump trailer to be towed by the tractor. The hole of the draw bar is adapted to be engageable with a coupler pivotally mounted on a rear axle of the dump truck thereby allowing the dump trailer to be drawn by the dump truck.

1 Claim, 7 Drawing Figures

APPARATUS FOR COUPLING A TRACTOR, A DUMP TRAILER AND A DUMP TRUCK

BACKGROUND OF THE INVENTION

This invention relates to an apparatus for coupling a tractor, a dump trailer and a dump truck wherein the dump trailer can be selectively drawn by the tractor or by the dump truck.

Generally, dump trucks and tractor-drawn dump trailers are used to transport rocks, sand and earth from loading sites to dumping sites. Conventional dump trailers have been exclusively drawn by tractors and no attempt has been made to allow dump trailers to be drawn by dump trucks.

SUMMARY OF THE INVENTION

It is therefore an object of the present invention to provide an apparatus for coupling a tractor, a dump trailer and a dump truck wherein the dump trailer is adapted to be drawn not only by the tractor but also by the dump truck.

Another object of the present invention is to provide a coupling apparatus of a tractor and a dump trailer wherein the tractor can turn at a very small turning radius when drawing the dump trailer.

In accordance with an aspect of the present invention, there is provided an apparatus for coupling a tractor, a dump trailer and a dump truck comprising an arm member pivotally connected with said tractor;

first coupling means provided at the leading end of said arm member;

a draw bar pivotally connected with said dump trailer, said draw bar having second and third coupling means formed thereon and said second coupling means being adapted to engage with said first coupling means so as to enable said dump trailer to be drawn by said tractor;

fourth coupling means pivotally mounted on the rear axle of said dump truck, said fourth coupling means being adapted to engage with said third coupling means so as to enable said dump trailer to be drawn by said dump truck after disconnecting said dump trailer from said tractor.

The above and other objects, features and advantages of the present invention will be readily apparent from the following description taken in conjunction with the accompanying drawings.

DETAILED DESCRIPTION OF THE INVENTION

The present invention will now be described by way of embodiment with reference to the accompanying drawings.

Figure 1:
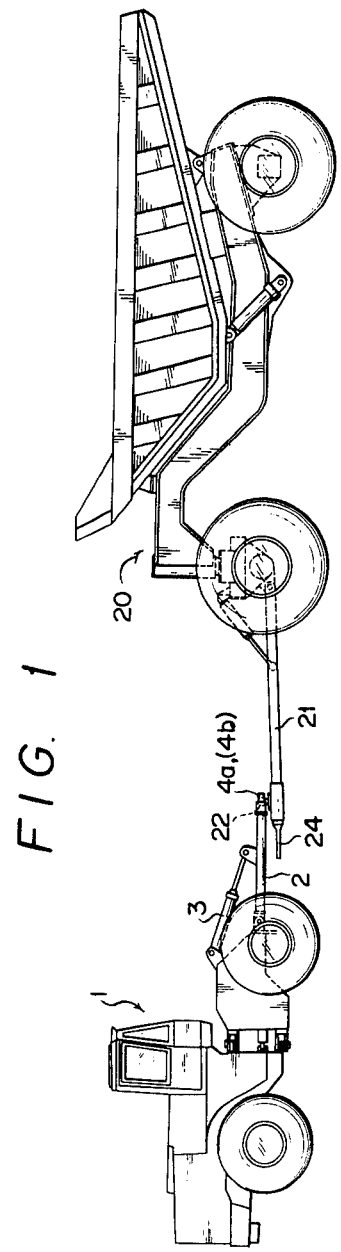
FIG. 1 is a side elevational view of a tractor and dump trailer combination employing a coupling apparatus according to the present invention.
Figure 2:
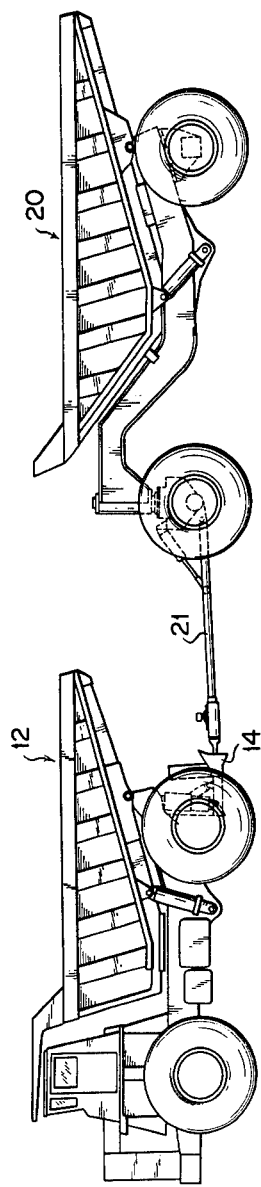
FIG. 2 is a side elevational view of a dump truck and dump trailer combination employing a coupling apparatus of the present invention.
Figure 3:
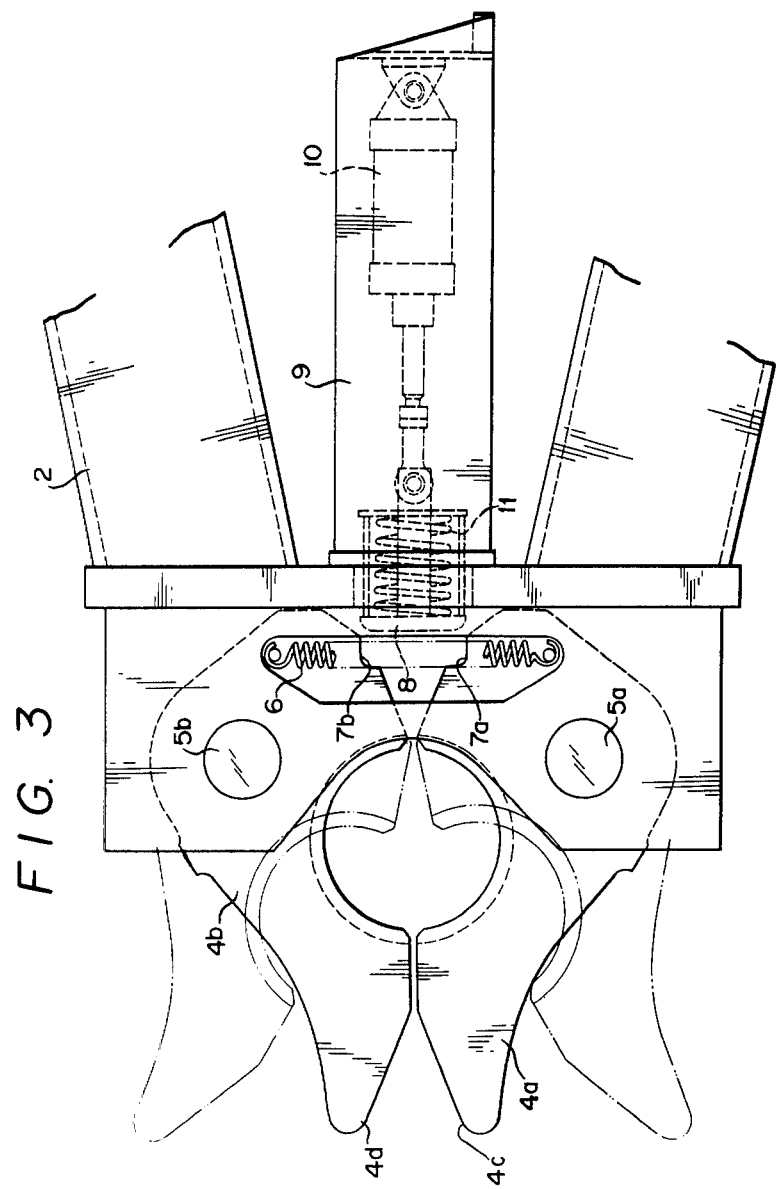
FIG. 3 is a plan view of a coupling portion between the tractor and the dump trailer.
Figure 4:
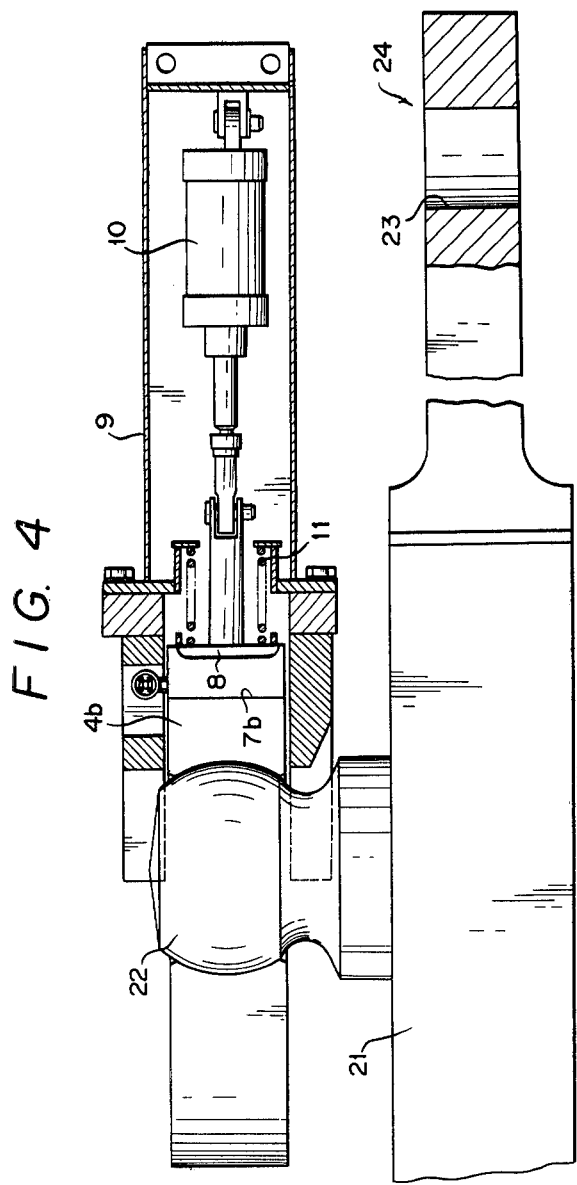
FIG. 4 is a longitudinal cross-sectional view of FIG. 3.

Reference numeral 1 denotes a tractor of articulated type which can be turned at a small radius and which comprises in the front part thereof an arm 2 mounted thereon so as to be pivoted vertically by the action of a hydraulic cylinder means 3. As shown in FIGS. 3 and 4, two coupling claws or grippers 4a and 4b each having a partial-spherical gripper portion in the opposite inner face thereof are pivotally mounted on the leading end of the arm 2 by pins 5a and 5b so as to be turned outwardly and in horizontal opposite directions. The claws 4a and 4b have inclined opposite faces 4c and 4d adapted to form a tapered space between them when the claws are closed. The bases of the coupling claws 4a and 4b are interconnected by a tension spring 6 which normally urges to open the claws. Further, the claws 4a and 4b have notches or recesses 7a and 7b formed in the bases thereof and which are located opposite to each other when the claws are closed. The notches 7a and 7b are formed to allow an oppositely located cotter 8 to enter freely therein. The cotter 8 is connected to a hyraulic cylinder means 10 supported by a frame 9, and is biased by a spring 11 towards the claws 4a and 4b.

Figure 5:
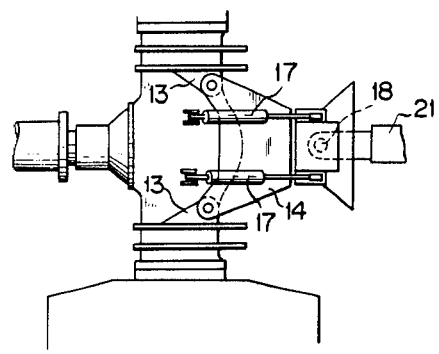
FIG. 5 is a plan view of a coupling portion between the dump truck and the dump trailer.
Figure 6:
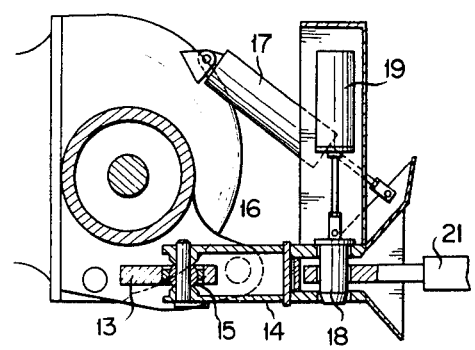
FIG. 6 is a longitudinal cross-sectional view of FIG. 5.

Reference numeral 12 denotes a dump truck, the rear axle of which has rearwardly extending brackets 13, 13 secured thereto as shown in FIGS. 5 and 6. Vertically pivotally connected through ball joints 15 to the brackets 13, 13 by means of pins 16 is a base end of coupler 14 for connecting a trailer. Reference numeral 17 denotes a damper for supporting the coupler 14 horizontally in general, and 18 a coupler pin adapted to be engaged and disengaged by the action of an air cylinder 19.

Reference numeral 20 denotes a dump trailer, and 21 a draw bar thereof. The draw bar 21 has in the leading end thereof a partial spherical trunnion 22 adapted to be engaged with the gripper portions of the coupling claws 4a and 4b of the tractor 1 as shown in FIG. 4, and a pin connecting portion 24 having a hole 23 in which the coupler pin 18 is inserted, said coupler pin 18 being adapted to be connected to the coupler of the dump truck 12. Thus, in order to connect the tractor 1 and the trailer 20, it is necessary for the operator to operate the steering gear of the tractor 1 and move the arm 2 up and down to locate the coupling claws 4a and 4b at the leading end of the arm 2 opposite to the trunnion 22 of the draw bar 12 and then slowly move the tractor 1 back so as to engage the trunnion 22 with the opposed gripper portions of the coupling claws 4a and 4b. As a result, the interior parts of the gripper portions of the coupling claws 4a and 4b are pushed by the trunnion 22 so as to be turned against the biasing force of the tension spring 6 in the direction of closing them. When the claws 4a and 4b are closed, the cotter 8 is biased and engaged with the notches 7a and 7b by the force of the spring 11 thereby locking the claws 4a and 4b under closed condition.

In order to disconnect the tractor 1 from the trailer 20, it is only necessary for the operator to withdraw the cotter 8 from the notches 7a and 7b by the actuation of the cylinder means 10 and at the same time drive the tractor 1 away from the trailer 20. By so doing, both the coupling claws 4a and 4b are opened by the resilient force of the tension spring 6 to allow the trunnion 22 to be withdrawn from the gripper portions of the claws thereby disconnecting the two vehicles.

Further, to connect the dump trailer 20 with the dump truck 12, it is necessary to pull out the coupler pin 18 and insert the pin connecting portion 24 of the draw bar 21 into the coupler 14 and then insert the coupler pin 18 into the hole 23.

Figure 7:
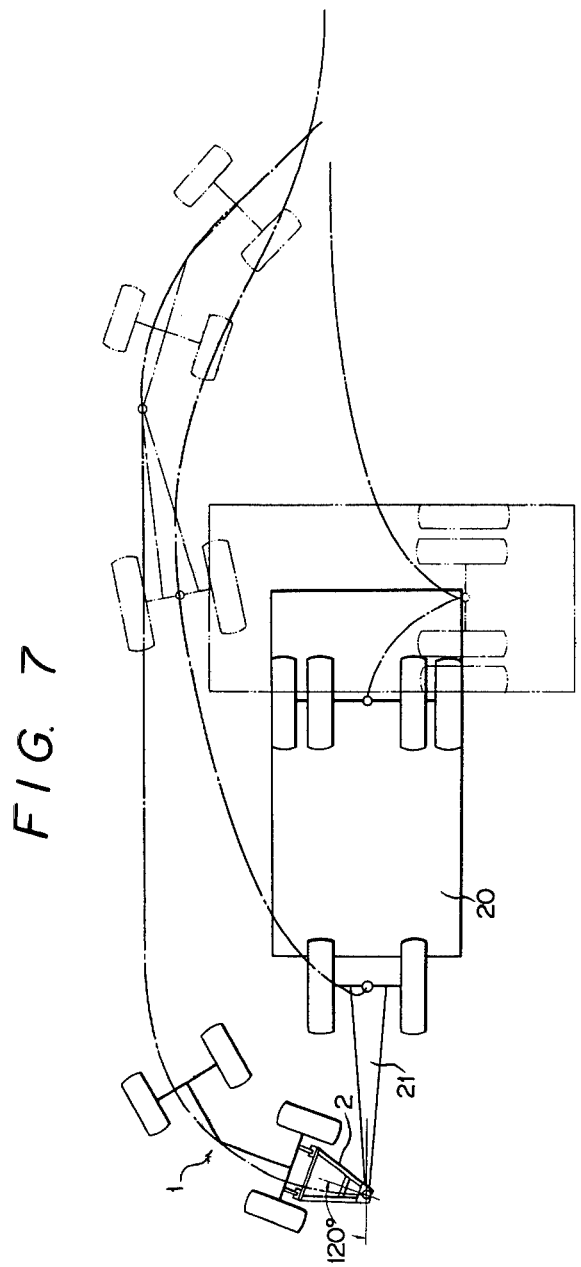
FIG. 7 is a locus of a tractor and dump trailer combination when it is turned.

As described hereinabove, according to the present invention, since the combination of vehicles comprises a tractor 1 of articulated type having an arm 2 which is mounted on its body so as to be turned vertically by a cylinder means 3 and which has a connecting means located at the leading end thereof, a dump truck 12 having a connecting means located at the rear end thereof, and a dump trailer 20 having at the leading end of its draw bar connecting portions adapted to be connected to those of the tractor 1 and the dump track 12, the dump truck 12 can tow the dump trailer 20 when transport earth and sand or the like from a loading site to a dump site such as reclaimed land etc. Therefore, as compared with the case in which the dump trailer is towed by the tractor which is used exclusively for traction and is not constructed to carry earth and sand etc, the volume of transportation can be remarkably increased thereby improving the transport efficiency. Further, by connecting the dump trailer 20 with the tractor 1 at dump sites, the angle between the tractor 1 and the draw bar 1 can be made ±120 degrees as shown in FIG. 7 so that the traction can be made even at an extremely small turning radius and dumping of the load can be made easily in a limited space. Further, selective use of the above-mentioned three types of vehicles can be made in such a manner that in case of long haul transportion the dump truck 12 is used for towing the dump trailer 20, whilst in case of dumping the load at the dump site the tractor 1 is used for towing the dump trailer 20. By so doing, the tractor 1 is used only at the dump site, and therefore the number of tractors 1 can be reduced against the number of dump trailers 20, which is very economical.

It should be understood that the present invention is not limited to the particular construction that is shown and described, since it will be apparent to those skilled in the art that variations may be made without departing from the scope of the invention as defined in the appended claims.

What we claim is:

1. An apparatus for coupling a tractor, a dump trailer and a dump truck, comprising:

an arm member pivotally connected to said tractor, said arm member being pivotable in the vertical direction;

first coupling means provided at the leading end of said arm member, said first coupling means comprising a pair of grippers arranged opposite to each other, each having a partial-spherical engaging hole formed therein at the opposing surfaces thereof, spring means mounted between said grippers so as to normally urge said pair of grippers away from each other at the leading ends thereof, cotter means engageable with said grippers when said grippers are closed thereby maintaining said grippers in the closed condition, and cylinder means coupled to said cotter means for moving said cotter means to engage and disengage said cotter means and said grippers;

a draw bar pivotally connected to said dump trailer, said draw bar having second coupling means formed thereon, said second coupling means comprising a trunnion having a partial-spherical surface adapted to be engageable with the engaging holes of said grippers to enable said dump trailer to be drawn by said tractor and rotate vertically and horizontally with respect thereto;

third coupling means formed on said draw-bar, said third coupling means comprising at least one hole formed in the leading end portion of said draw bar; and fourth coupling means pivotally mounted on a rear axle of said dump truck said fourth coupling means being adapted to engage with said third coupling means to enable said dump trailer to be drawn by said dump truck after disconnecting said dump trailer from said tractor wherein said fourth coupling means comprises a coupler mounted on the rear axle of said dump truck so as to pivot in the vertical direction, said coupler having a hole formed therein at the trailing end portion thereof, a pair of damper means for supporting said coupler approximately in horizontal position, and fluid cylinder means mounted on said coupler means, said fluid cylinder means having a coupler pin connected with a piston rod thereof, said coupler pin being adapted to be inserted into said at least one hole of said third coupling means and said coupler so as to connect said dump trailer with said dump truck.

* * * * *